United States Patent [19]
Kodera

[11] 3,965,671
[45] June 29, 1976

[54] STRAP FOR WRIST WATCH

[75] Inventor: Yoshinobu Kodera, Chiba, Japan

[73] Assignee: Bear Co. Ltd, Tokyo, Japan

[22] Filed: Dec. 5, 1974

[21] Appl. No.: 529,963

[30] Foreign Application Priority Data
Sept. 25, 1974 Japan................................ 49-115253
Sept. 25, 1974 Japan................................ 49-115254
Sept. 25, 1974 Japan................................ 49-115255

[52] U.S. Cl. .................................................. 59/80
[51] Int. Cl.² ...................................... F16G 13/00
[58] Field of Search .............. 59/80, 82, 78; 63/4; 224/4 B, 4 D, 4 H

[56] References Cited
UNITED STATES PATENTS

| | | | |
|---|---|---|---|
| 738,596 | 9/1903 | Bellis | 59/78 |
| 1,214,135 | 1/1917 | Clark | 59/80 |
| 1,735,384 | 11/1929 | Fielding | 59/80 |
| 2,165,115 | 7/1939 | Schultheiss | 224/4 D |
| 3,690,064 | 9/1972 | Pompeo | 59/80 |

FOREIGN PATENTS OR APPLICATIONS

| | | | |
|---|---|---|---|
| 417,653 | 9/1910 | France | 59/78 |

*Primary Examiner*—C. W. Lanham
*Assistant Examiner*—Gene P. Crosby
*Attorney, Agent, or Firm*—William A. Drucker

[57] ABSTRACT

There are provided straps particularly adapted for use with wrist watches, characterised by that the strap comprises a plurality of inner strap elements connected to one another side by side in series, and a plurality of ornamentally designed outer strap elements each having a unique configuration devoid of any bores or through bores for receiving connecting pins as used in conventional similar straps. The strap is so constructed that the inner strap elements are in rigid engagement within associated central transverse grooves of the outer strap elements so as for the whole strap to provide such an appearance as if the outer strap elements were flexibly connected directly to one another without intervening of said inner strap elements therebetween.

2 Claims, 7 Drawing Figures

(A)

(B)

STRAP FOR WRIST WATCH

DETAILED DESCRIPTION

This invention relates to improvements in or to straps for wrist watches, and more particularly to a metal-made wrist watch strap which comprises a series of ornamentally designed outer strap elements flexibly connected to one another by means of a series of inner strap elements mutually connected, in such a manner that it looks as if the outer ornamental strap elements were flexibly connected directly to one another without the aid of such inner strap elements. Further, only the outer ornamental strap elements present themselves on the front and lateral side surfaces of the strap so that the strap may have a neat and streamlined appearance. It is a primary object of the invention to provide straps for wrist watches which include inner strap elements which are high in mechanical strength despite their being made of metal plates, and which require no insertion holes for connecting pins as most employed in conventional similar straps, and therefore are free of accidental disengagement of the connecting pins from the holes, thus entirely preventing disengagement of the inner strap elements from the outer strap elements. A further object of the invention is to provide wrist watch straps which may be manufactured on a mass production basis.

Conventionally known have been wrist watch straps which comprise ornamentally designed outer strap elements flexibly connected to one another by means of inner strap elements in engagement with said outer strap elements, in such a manner that the strap looks as if the ornamental outer strap elements alone were flexibly connected directly to one another without intervening of such inner strap elements, only said outer strap elements presenting themselves on the surfaces of the strap. Such conventional wrist watch strap is assembled as follows: First, a plurality of ornamental outer strap elements each formed with a central transverse engaging groove are arranged side-by-side with the central transverse engaging grooves in alignment with one another, followed by fitting a plurality of inner strap elements of a configuration corresponding to that of the central transverse engaging groove, into these central transverse engaging grooves in side-by-side arrangement. The ornamental outer strap element and inner strap element have the both ends thereof formed with longitudinal through bores, respectively. Thus, the wrist watch strap is assembled by inserting connecting pins through the mutually aligned through bores of the outer and inner strap elements coupled together.

This construction, however, has the disadvantage that it is rather difficult not only to provide such through bores in the inner and outer strap elements but also to align the through bores of the inner and outer strap elements with the respective proper connecting pins for facilitating insertion of the connecting pins therethrough. Particularly, this operation requires rather complicated and minute handwork, so that its mass production is not available. Further, the completed wrist watch strap has a poor appearance because the insertion through bores and connecting pins are exteriorly presented on the end faces of the outer strap elements. Still further, it is necessary to provide said insertion through bores particularly on the outer ends of the strap elements for enabling insertion or removal of the connecting pines with respect to the strap elements for the purpose of adjusting the whole length of the strap.

As to the inner strap element, those inner strap elements are known which are formed by folding a single metal plate. Those inner strap elements comprise plate-like main bodies of a single layer structure, and tubular flanges at opposed side edges thereof, both formed by folding the side edge portions. Since the main body has thus a single layer structure and the tubular flanges are thus formed by merely folding the side edge portions of the plate, the inner strap element is low in mechanical strength, e.g. the main body is apt to be bent or broken and the tubular flange portions to get out of their folded state.

Further objects and advantages of the present invention and the manner in which it is carried into practice are made apparent in the following specification wherein, as noted above, the invention is described in detail with reference to the accompanying drawings, in which.

Figure 5:
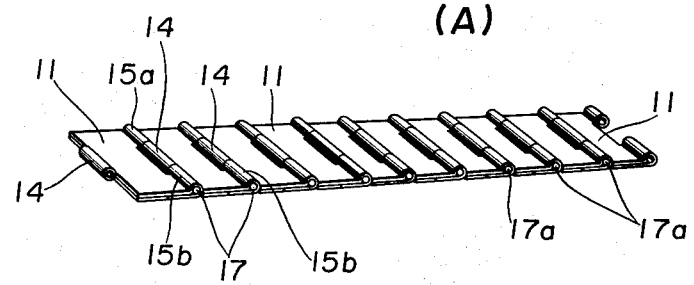
Figure 5:
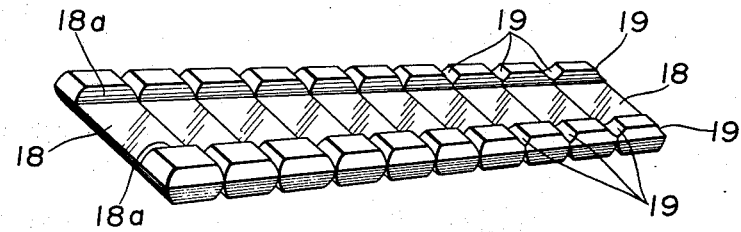
Figure 6:
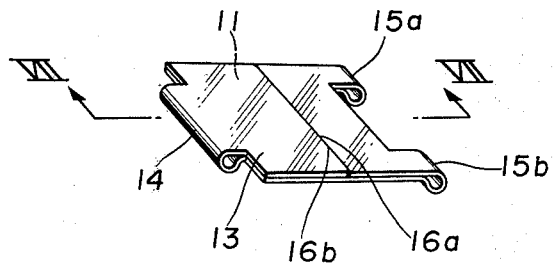
Figure 7:
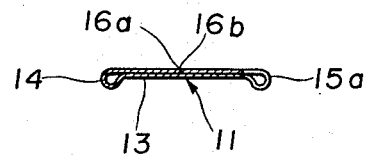

FIGS. 5 (A) and (B) are perspective views showing, respectively, reverse portions of series of inner strap elements and ornamental outer strap elements according to the invention;

FIG. 6 is a perspective view showing an obverse portion of one of the inner strap elements of FIG. 5 (A); and FIG. 7 is a longitudinally sectional view of the same strap element, taken along line VII - VII of FIG. 6.

Referring now to FIGS. 1 through 4 and FIGS. 5 through 7, description is made of one embodiment according to the invention. In these drawings, reference numeral 10 designates a wrist watch strap according to the invention which essentially comprises a plurality of inner strap elements 11 connected in series, and a plurality of ornamentally designed outer strap elements 12 corresponding to the number of said inner strap elements and arranged in series. These outer strap elements are devoid of any bores or through bores for connecting pins as used in conventional similar parts. Said inner strap elements 11 are generally of an identical structure, each being composed of a square metal plate which is folded to form a plate-like main body 13 of a double layer structure with both ends 16a, 16b of the metal plate abutting against each other at about the center of the main body 13. The platelike main body 13 has one side thereof formed with a generally central tubular flange 14, and the other side formed with two tubular flanges 15a, 15b. The inner strap elements 11 are connected to one another in such a fashion that as shown in FIG. 5 (A) the tubular flange 14 of one side of an inner strap element 11 is interposed and engaged between the tubular flanges 15a, 15b of the corresponding side of an adjacent inner strap element 11 with connecting pins 17 penetrating the tubular flanges 14, 15a, and 15b. Thus, a flexible connection is obtained which allows pivoting of the individual inner strap elements relative to their adjacent ones.

Said ornamental outer strap element 12 comprises a main body 12a made of an excellently ornamental material such as stainless steel or the like and having its reverse surface (inner surface) formed with a central transverse groove 18 traversing the width of the main body 12a. This groove 18 may have a depth a little larger than the overall thickness of said inner strap element 11. A plurality of said ornamental outer strap elements 12 are arranged side by side in series with the respective central transverse grooves in alignment with one another, as seen in FIG. 8 (B), and then into the thus aligned grooves are fitted a series of previously mutually connected inner strap elements 11 as seen in FIG. 8 (B). Then, the individual inner strap elements 11 are properly positioned on their corresponding outer strap elements 12, respectively. Thus, the tubular flanges 14, 15a, 15b of the individual inner strap elements 11 are positioned, respectively, between their proper outer strap elements 12.

Figure 1:
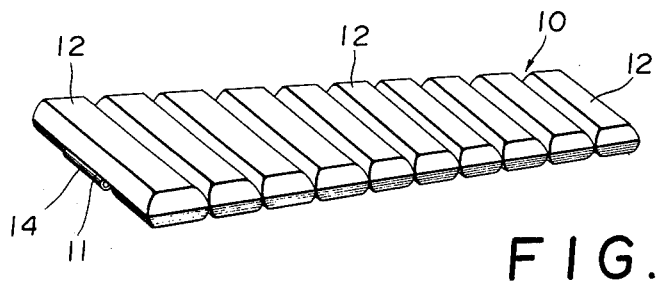
FIG. 1 is a perspective view showing an obverse portion of a wrist watch strap according to the present invention.
Figure 2:
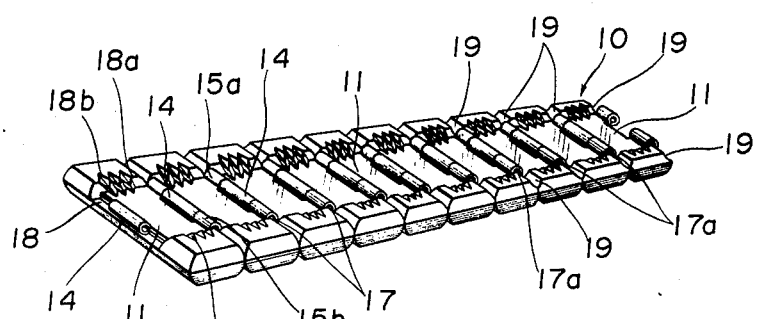
FIG. 2 is a perspective view showing a reverse portion of the same wrist watch strap.
Figure 3:
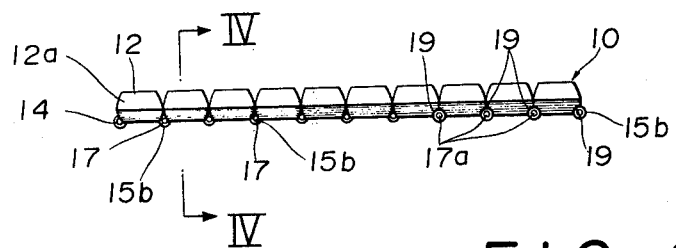
FIG. 3 is a side view showing the same strap.
Figure 4:
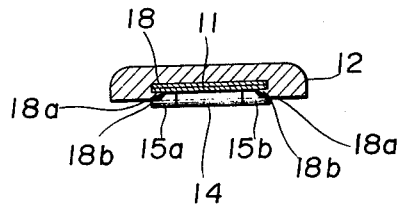
FIG. 4 is a transversely sectional view of the same strap taken along line IV – IV of FIG. 3.

Under this state, the non-grooved end portions 18a, 18a, of the outer strap elements 12 are subjected to pressing by means of a press or the like so that the inner edges 18b are inwardly stretched like comb teeth so as to cover end edges of the inner strap elements 11 as shown in FIG. 4. Thus, by pressing or in other words caulking the non-grooved portions 18a, particularly the inner edges 18b, the ornamental outer strap elements 12 are secured over the respective inner strap elements 11 (over the outer side surfaces of the inner strap elements 11) thus to complete a wrist watch strap 10 as shown in FIGS. 1 to 3.

Further, of the connecting pins 17 for connecting together the inner strap elements 11 some pins 17a are freely removable from the strap for varying the whole length of the strap. For this purpose, some of the outer strap elements 12 have longitudinal notches 19 formed on one or both sides of the opposed end portions 18a thereof which face the both end faces of a pin 17a, for allowing removal and insertion of the pins 17a with respect to the strap. Accordingly, to adjust the whole length of the strap, pins 17a may be removed or inserted through the notches 19 for increasing or decreasing the number of the outer strap elements 12 together with the inner strap elements paired therewith.

Except for these removable pins 17a, the other pins 17 are prevented from making axial movement thereof, because either of the ends of the pins 17 is hit against the adjacent end portion 18 of the associated outer strap element 12. Thus, the pins 17 are not easily disengaged from the strap.

Further, if the depth of the fitting groove 18 is previously designed larger than the overall thickness of the inner strap element 11, the caulked portions find themselves lower or inner than the reverse surfaces of the outer strap elements 12 and never project therefrom, thus dispensing with the need of adding particular finishing cut to the caulked portions.

With the above-mentioned integral combination of the inner strap elements 11 with the outer strap elements 12 as shown in FIG. 2, the outer strap elements 12 are connected to one another in series in a fashion that the individual outer strap elements 12 are pivotable about the side edge or edges thereof with respect to the adjacent ones via the inner strap elements 11, whereas the whole strap looks as if the outer strap elements 12 were connected directly to one another without intervening of the inner strap elements, and only the ornamental outer strap elements exteriorly present themselves on the obverse side of the strap.

Further, when the inner strap elements 11 and ornamental outer strap elements 12 are pressed together or caulked, the layers of the double layered portions of the inner strap elements are made stuck closely to each other which cooperates with the double layered structure to enhance the overall mechanical strength of the strap.

In said embodiment, securement of the inner strap elements to the ornamental outer strap elements was effected by caulking. But, other securing means may be employed such as adhesion, welding.

As stated in the foregoing, the wrist watch strap according to the present invention comprises a plurality of inner strap elements, and a plurality of ornamentally designed outer strap elements corresponding to the number of said inner strap elements, and devoid of any bores or through bores and is assembled so that the inner strap elements are previously connected to one another each pivotably with respect to its adjacent one, to be followed by fitting the main bodies of the thus mutually connected inner strap elements into their respective associated central transverse grooves of the outer strap elements, respectively. Thus, the resultant strap offers such an appearance as if the outer strap elements were flexibly connected directly to one another and since only the ornamental outer strap elements exteriorly present themselves or appear on the obverse side of the strap, the strap gives a neat and streamlined impression. Further, since the present invention dispenses with the need of providing through bores for connecting pins on the inner and outer strap elements, mass production of the strap is feasible and also it is possible to reduce the number of man-hour for assembling the strap. Still further, since the ornamental outer strap elements need not have any connecting pins nor bores for such connecting pins exposed exteriorly thereof, they may have a fine appearance when completed as a strap. Moreover it is not necessary to change the inner strap elements even in the case of changing the design of the ornamental outer strap elements, but these inner strap elements are versatilely useable with a variety of ornamental strap elements of different designs, thus contributing to facilitation of the management of the component parts.

A particularly advantageous form of the wrist watch strap of the invention comprises a plurality of inner strap elements having tubular flanges on the side edges thereof, and a plurality of ornamentally designed outer strap elements being the same in number as said inner strap elements and each having the reverse side thereof formed with a central transverse groove traversing the width thereof, and is assembled in a manner such that first the inner strap elements have their tubular flanges penetrated by connecting pins for connection to one another so as to allow each element to make pivotal movement relative to its adjacent one or ones, and subsequently the thus connected inner strap elements are fitted into the central transverse grooves of the associated outer strap elements. Thus the inner strap elements have their main bodies embedded within the ornamental outer strap elements.

Further, as stated above, the inner strap element is formed by folding a metal plate into a main body of a double layered structure having its opposed side edges formed as tubular flanges for receiving connecting pins, and is connected to its adjacent inner strap element by fitting its central flange of one side edge thereof between the flanges of the corresponding side edge of the adjacent element. Therefore, despite being made of a metal plate, it may have sufficiently high mechanical strength. Still further, since notches are longitudinally provided on some of the ornamental outer strap elements for permitting removal and insertion of the connecting pins with respect to the inner strap elements through the associated outer strap elements, there is no need of providing bores on the outer strap elements for removing or inserting the connecting pins in order to vary the whole length of the strap, while those connecting pins positioned adjacent non-notched outer strap elements may be fully prevented from slipping out of the strap because of they being hit against the inner edges of the grooves. Still further, due to this arrangement, the connecting pins are not exposed exteriorly of the strap and therefore the resultant strap has a fine appearance.

Having described specific embodiments of my invention, it is believed obvious that modification and variation of the invention is possible in light of the above teachings.

What I claim is:

1. A strap adapted for use with a wrist watch, comprising:
    a plurality of inner strap elements each composed of a square main body of metal plate and having opposed sides thereof formed with one or two tubular flanges said tubular flanges being so arranged that the tubular flange or flanges of one side of said inner strap element are adapted to be engaged in axial alignment with the tubular flange or flanges of the associated side of the next adjacent inner strap elements when said inner strap elements are arranged in juxtaposition, said inner strap elements being pivotally connected with one another side by side in series with said tubular flanges engaged with associated tubular flanges of the next adjacent inner strap elements;
    a plurality of connecting pins inserted through said tubular flanges thus axially aligned with the next adjacent ones while permitting said inner strap elements to be pivotal about the side edge or edges thereof relative to one another;
    a plurality of ornamentally designed outer strap elements of the number corresponding to that of said inner strap elements, each having a central portion of the reverse or inner side surface thereof formed with a transverse groove traversing the width thereof, the size and configuration of said groove being of such an extent as to permit at least the main body of said inner strap elements to be fitted within said groove, and the depth of said groove being larger than the overall thickness of said inner strap element, said outer strap elements being arranged in juxtaposition with the respective grooves in alignment with one another in which grooves are fitted the main bodies of the thus previously connected inner strap elements while still permitted to make said pivotal movement; and
    securement means for securing the outer strap elements with respect to the inner strap elements thus fitted within said grooves in such a manner that said central transverse grooves have upper edges of the opposed end walls thereof subjected to caulking so that said upper edges are inwardly stretched like comb teeth to cover end edges of the associated inner strap elements, the caulked portions finding themselves lower or inner than portions of the outer strap elements other than the groove portions, wherein said outer strap elements have opposed end portions other than the portions where said central transverse grooves are formed so configurated that said connecting pins have ends thereof blocked against said end portions to be prevented from making axial movement thereof.

2. The strap as recited in claim 1, in which a part of said outer strap elements are formed with longitudinal notches along one or both sides of said opposed end portions thereof, said notches being opposite end faces of associated ones of said connecting pins for permitting removal or insertion of said associated connecting pins with respect to said strap.

* * * * *